United States Patent [19]
Kohlschmidt

[11] Patent Number: 5,654,960
[45] Date of Patent: Aug. 5, 1997

[54] TIME DIVISION MULTIPLE ACCESS DIGITAL TRANSMISSION SYSTEM, AND A STATION FOR USE IN SUCH A SYSTEM

[75] Inventor: Peter Kohlschmidt, Binfield bracknell, United Kingdom

[73] Assignee: U.S. Philips Corporation, New York, N.Y.

[21] Appl. No.: 495,131

[22] Filed: Jun. 27, 1995

[30] Foreign Application Priority Data

Jun. 28, 1994 [EP] European Pat. Off. .............. 94201860

[51] Int. Cl.$^6$ .............................. H04B 7/212; H04B 7/26
[52] U.S. Cl. .................... 370/337; 370/347; 370/442; 370/519
[58] Field of Search ..................... 370/95.1, 95.3, 370/100.1, 103, 104.1, 105.3, 108; 375/354, 356, 358, 371, 373; 379/58, 59, 60, 63; 455/33.1, 33.2, 33.4, 51.1, 53.1, 54.1, 56.1, 67.1, 67.6, 69

[56] References Cited

U.S. PATENT DOCUMENTS 3,798,650  3/1974  McComas et al. .................. 375/356

OTHER PUBLICATIONS

"The GSM System for Mobile Communications: A comprehensive overview of the European Digital Cellular Systems", M. Mouly et al, 1992, pp. 195–216; 227–241.

"Mobile Radio Communications", R. Steele, 1992, pp. 696–698.

"GSM Recommendation GSM 05.10".

*Primary Examiner*—Alpus H. Hsu
*Attorney, Agent, or Firm*—Arthur G. Schaier

[57] ABSTRACT

A time division multiple access digital transmission system is provided in which the various clock systems in mobile radio stations are derived from the same reference clock signal generator which is controlled with an adjustment signal (adj) which is a function of at least a derivate ($TOI_d$) of a determined time delay (TOI) between a received time slot position and an expected time slot position. Preferably, the control function also includes a mean ($TOI_m$) of the determined delay.

17 Claims, 3 Drawing Sheets

TIME DIVISION MULTIPLE ACCESS DIGITAL TRANSMISSION SYSTEM, AND A STATION FOR USE IN SUCH A SYSTEM

BACKGROUND OF THE INVENTION

1. Field of the Invention

The present invention relates to a time division multiple access digital transmission system comprising at least one primary station and a plurality of secondary stations, in which system the primary station transmits information to the secondary stations in frames comprising synchronisation information, and comprising user information in time slots, and in which system the secondary stations comprise a reference clock signal generator. Such a transmission system can be a mobile radio system, a cordless telephony system, or the like, or any system of the above kind in which primary and secondary stations have to be synchronised with respect to each other.

The present invention further relates to a secondary station for use in such a system.

2. Discussion of the Related Art

A time division multiple access digital transmission system of this kind is known from the handbook "The GSM System for Mobile Communications", M. Mouly et al, published by the authors, 1992, pp. 195–216, pp. 227–241, and from the handbook "Mobile Radio Communications", R. Steele, Pentech Press, 1992, pp. 696–698. In these handbooks a Time Division Multiple Access TDMA mobile radio system, or system arranged according to the so-called Global System for Mobile Communications (GSM standard), and sychronisation of a mobile radio station (MS) to a radio base station (BS) in such a GSM system is described. Although in general terms sychronisation is described, as according to the GSM Recommendation GSM 05.10, in which it is prescribed, for example, that the mobile radio station carrier frequency shall be accurate to within 0.1 parts per million, (PPM) or accurate to within 0.1 ppm compared to signals received from the radio base station, the GSM Recommendations do not specify the BS-MS synchronisation algorithms to be used, these being left to the equipment manufacturers.

In prior art GSM systems, synchronisation of a mobile radio station to a received datastream in time slots of TDMA frames may occur via two separate control loops. One control loop determines a time slot delay between a received time slot position intended for the mobile radio station and an expected time slot position. When an expected time slot position does not agree with the received time slot position, the expected time slot position is corrected with the difference between the two. Another control loop evaluates the frequency offset between a received carrier frequency and an expected received carrier frequency with respect to the frequency of a reference clock signal in the mobile radio station. The determined frequency offset is used to correct the frequency of the reference clock signal generator. A time slot sampling clock for an intermediate frequency or a base band signal derived from a received burst signal, and a data clock for clocking received data samples to a speech decoder, are derived from the reference clock signal.

Due to the fact that both, independently operating, control loops control are acting upon the same cause, i.e., a Doppler effect causing varying symbol delays in the transmission channel between the radio base station and the mobile station, and instability of the reference clock signal generator, the data clock may shift with respect to the time slot sampling clock. This leads to a data sample slip causing a discrepancy between a) reading in/out of an input-output-buffer for speech samples acquired from/to be submitted to signal bursts or time slots and b) the operation of a speech decoder/coder. Due to such a discrepancy, speech data may be lost. When other data than speech data, e.g., computer data or FAX data are exchanged between the radio base station and the mobile radio station, the data clock slip may even give rise to an unacceptable situation.

In another prior art synchronization solution the data clock is not derived from the reference clock signal, but is controlled separately. Unfortunately, such a solution necessitates more complex hardware.

SUMMARY OF THE INVENTION

It is an object of the present invention to provide a time division multiple access digital transmission system of the above kind not having the drawbacks of known systems as to synchronisation.

To this end the time division multiple access digital transmission system according to the present invention is characterised in that a secondary station comprises
1) time slot delay determining means for determining a time slot delay between a received time slot position for the secondary station and an expected time slot position, and
2) conversion means for converting the determined time slot delay into a first frequency offset, which is included in an adjustment signal for adjusting a frequency of the reference clock signal generator. Advantageously, all clocks in the secondary station can be derived from the reference clock signal generator, without giving rise to unacceptable data slip, and its resulting lost data.

The present invention is based upon the insight that the first frequency offset as derived from the determined time slot delay is a measure for the frequency offset between the primary station and the secondary station, independent of the cause of such an offset. Such a cause may be: 1) a frequency instability of the reference clock signal generator in the secondary station, 2) a varying symbol delay in the transmission channel between the primary and the secondary station, 3) a Doppler shift due to a secondary station moving away from a primary station, or 4) the like.

In an embodiment of a time division multiple access digital transmission system according to the present invention, the adjustment signal is a function of the determined first frequency offset and the determined time slot delay. With a proper choice of the function, e.g. a proportionality function, the determined time slot delay can virtually be eliminated.

In an embodiment of a time division multiple access digital transmission system according to the present invention, a time slot sampling clock and a data clock in the secondary station are derived from a reference clock signal. Herewith, data slip is effectively counteracted.

In an embodiment of a time division multiple access digital transmission system according to the present invention, determined time slot delays are filtered by means of a smoothing filter before being included into the adjustment signal. Herewith, the requirements of GSM Recommendation 05.10 can be fulfilled.

In an embodiment of a time division multiple access digital transmission system according to the present invention, the system is modified in that the adjustment signal includes a second frequency offset signal instead of the first frequency offset signal, in case of an expected discontinuity in the determined time slot delay, the second frequency offset signal being a signal which is proportional to a received carrier signal frequency and an expected received carrier frequency. Herewith, also situations like initial sychronisation, or a time slot change in case of handover, can be dealt with.

BRIEF DESCRIPTION OF THE DRAWINGS

The present invention will now be described, by way of example, with reference to the accompanying drawings, wherein FIG. 1 schematically shows a time division multiple access digital transmission system according to the present invention.

Throughout the figures the same reference numerals are used for the same features.

DETAILED DESCRIPTION OF THE PREFERRED EMBODIMENTS

Figure 1:
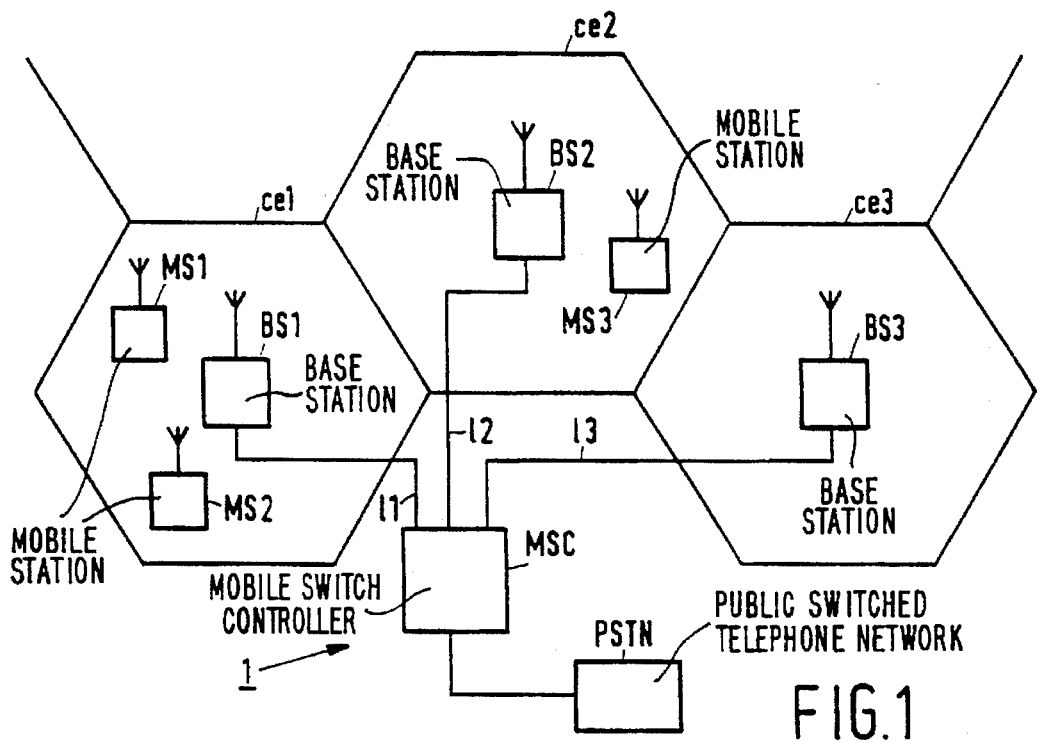

FIG. 1 schematically shows a time division multiple access digital transmission system 1, for example, a cellular mobile radio system arranged according to the (Global System for Mobile Telecommunications (GSM standard), as defined by the European Telecommunications Standards Institute (ETSI), including radio base stations BS1, BS2 and BS3 as primary stations. Base stations BS1, BS2, and BS3 cover radio communication in the respective cells ce1, ce2 and ce3. In order not to cause interference with neighbouring cells the radio base stations, at least in adjacent cells, transmit and receive at different frequencies. Usually each radio base station BS1, BS2 and BS3 transmits and receives on a number of frequencies, e.g., twelve frequency channels per base station. By employing time division multiplexing arrangement, such as TDMA, in GSM with eight time slots per frequency channel, 96 logical channels are available for radio communication per base station. The radio base stations BS1, BS2 and BS3 communicate with mobile radio stations MS1, MS2 and MS3 as secondary stations, the mobile radio stations being present in their respective. In the example shown in FIG. 1, the radio base station BS1 communicates with the mobile stations MS1 and MS2, and the radio base station BS2 communicates with the mobile station MS3.

When mobile radio stations are roaming through the cells ce1, ce2 and ce3 a so-called handoff from one radio base station to another should occur if the quality of the communication link deteriorates. Overall control of the system is carried out by a Mobile Switching Centre MSC, which is connected to the radio base stations BS1, BS2 and BS3 by means of landlines 11, 12 and 13 respectively. The MSC is connected to a Public Switched Telephone Network PSTN, in case of Public Mobile Radio. For Private Mobile Radio, such a connection can be dispersed with.

In a GSM system, to protect the data from transmission errors on the radio path, among other operations, channel coding is applied on the logical channels before transmission and channel decoding is performed upon data reception. Thus, much (quasi) real time processing is required on data to be transmitted. To this end, and for other processing tasks, the radio base stations comprise a number of processors, and a number of channel codecs, channel encoders and decoders (not shown in detail here).

For a more detailed description of a cellular system, e.g., GSM, refer to the above-mentioned handbooks of Mouly and Steel.

Figure 2:
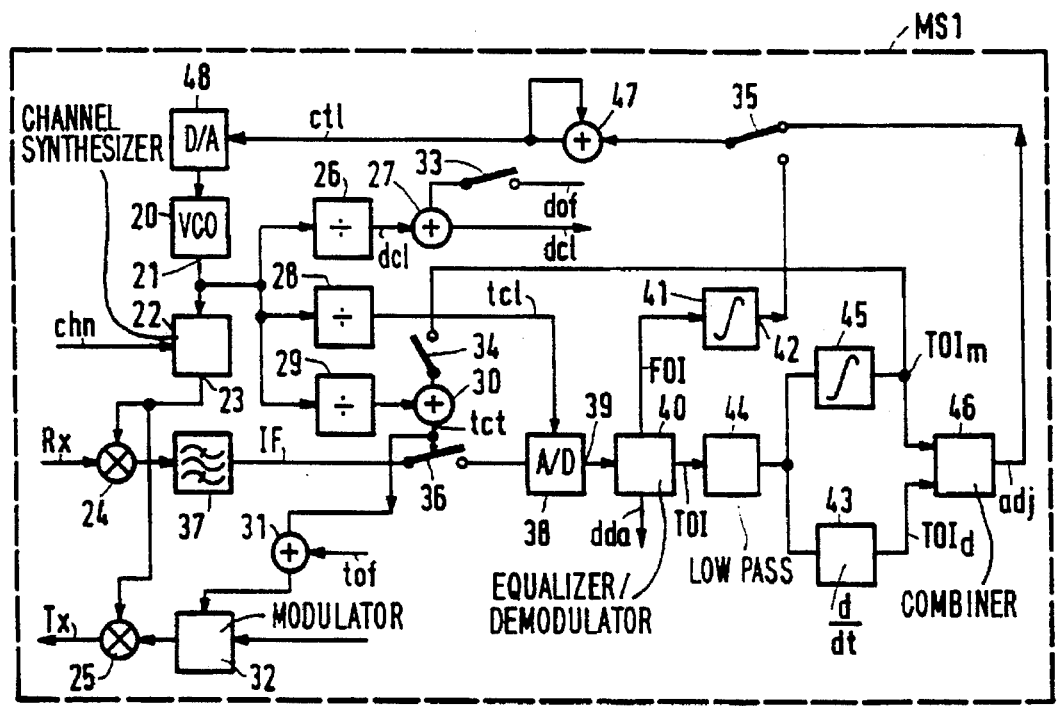
FIG. 2 shows a secondary station according to the present invention, for use in such a system.

FIG. 2 shows a secondary station MS1 according to the present invention, for use in the TDMA digital transmission system 1. MS1 has a receiving branch Rx and a transmitting branch Tx. The secondary station MS1 comprises a voltage controlled oscillator 20 as a reference clock signal generator, an output 21 of which is coupled to a channel synthesizer 22. A channel number control signal chn can be fed to the channel synthesizer 22 for selecting a channel. Such a channel number control number chn is provided by a processor (not shown) programmed for operating the secondary station MS1 in a known way so that, no further details need be given herein as to the known operating functions of the secondary station MS1. An output 23 of the synthesizer 22 is coupled to a first mixer 24 of the receiving branch 24, and to a second mixer 25 of the transmitting branch Tx.

The reference clock signal generator 20 provides a data clock dcl via a first divider 26 which is coupled to a first phase offset adder 27 for adding a data offset signal dof in case of an external synchronisation. Such an external synchronisation is carried out in case of a discontinuous change of a received time, slot position in the secondary station MS1, to e.g., with initial synchronisation of the secondary station MS1 to the primary station BS1, or with a handoff. With such an external synchronisation data clock synchronisation cannot be guaranteed, but at such an instant data clock synchronisation is not necessary.

The reference clock signal generator 20 further provides a time slot sampling clock tcl via a second divider 28, and a time slot control signal tct via a third divider 29 which is coupled to a second phase offset adder 30 for adding a mean determined time slot delay $TOI_m$ as determined according to the present invention, in case of an external sychronisation. The time slot control signal tct is also fed to a third phase offset adder 31 which is coupled to a modulator 32 in the transmitter branch Tx, a transmitting offset signal tof being applied to the offset adder 31.

Switches 33, 34, and 35 are provided for switching over from a synchronisation of the secondary station MS1 in acordance with the present invention to an external synchronisation, which is well known in the art. The switches 33, 34, and 35 are shown positioned for synchronisation in accordance with the present invention.

The time slot control signal tct controls a switch 36 which couples a filter 37 in the receiving branch Rx to an analog-to-digital converter 38. The filter 37 provides an intermediate frequency signal IF. Instead of an intermediate signal IF, a base band signal can be provided by the filter 37. The type of signal supplied by the filter 37 depends on whether secondary station MS1, has an IF-receiver front end whereby base band conversion is carried out in a further stage (not shown), or a direct-conversion front end (not shown). The intermediate frequency signal is sampled in an expected time slot position by the analog-to-digital converter 38, the expected time slot position being derived from information received at initial synchronisation, e.g., see pp. 214–216 of the above noted handbook of Mouly.

An output 39 of the analog-to-digital converter 38 is coupled to an equalizer/demodulator arrangement 40, e.g., implemented as a programmed signal processor (not shown). The equalizer/demodulator 40 determines a) time slot delay TOI which is a delay between a received time slot position and the expected time slot position, this information to be used as according to the present invention, and b) a frequency offset signal FOI, which is used in case of an external synchronisation. In the latter case, the signal FOI is fed to a first integrator 41, an output 42 of which is coupled to the switch 35.

The equalizer/demodulator 40, providing demodulated data dda, may determine the received time slot position from a received training sequence by means of a cross correlation of the received training sequence with a known transmitted bit pattern of the training sequence. The training sequence is transmitted by the primary station BS1, together with transmitted data. The expected time slot position being known, because of the fact that the position of the training sequence within the time slot is known, the time slot delay TOI is determined as a deviation from the known position.

According to the present invention, the determined time slot delay TOI is fed to a differentiating arrangement 43 after having been filtered with a low pass filter 44. The determined time slot delay TOI is also fed to a second integrator 45 which smoothes the determined time slot delay TOI so as to form the mean determined time slot delay $TOI_m$. A differentiated determined time slot delay $TOI_d$ and the mean or integrated determined time slot delay $TOI_m$ are fed to a combiner arrangement 46 which provides an adjustment signal adj for adjusting the reference clock signal generator 20 to varying time slot delays such that no unacceptable data clock slip occurs. The adjustment signal adj preferably is a function of the determined quantifies $TOI_d$ and $TOI_m$, e.g., a proportionality function. If $TOI_m$=0, then df=dTOI/dt=–adj, d/dt being a differential operator. If $TOI_m$<>0, then adj=–df+k.$TOI_m$, <> representing inequality, and k being a proportionality factor. By means of a computational block 47, a current value of a control value ctl is determined, which is fed to a digital-to-analog converter 48 that controls the reference clock signal generator 20, the current value being an addition of a previous value of the control value ctl and a previous value of the adjustment signal adj. According to the present invention, for control of the reference clock generator 20 in a situation of continuous control, i.e. no discontinuities in the mean delay $TOI_m$, no control via the offset FOI is necessary, because a frequency offset between a master oscillator (not shown) in the primary station BS1 and the reference clock signal generator in the secondary station is directly reflected in the delay TOI. A varying delay TOI, with time, corresponds to a frequency offset between the primary station BS1 and the secondary station MS1, and a mean delay $TOI_m$<>0 indicates non-synchronity in the received time slot position. For short term averaging, the integrator 45 should have a time constant<<dt.

Note that instead of using the smoothed time slot delay ($TOI_m$) in determining the adjustment signal, the determined time slot delay (TOI) may be used directly. Such an embodiment of the invention yields a coarser result, but it eliminates the need for integrator 45.

Figure 3:
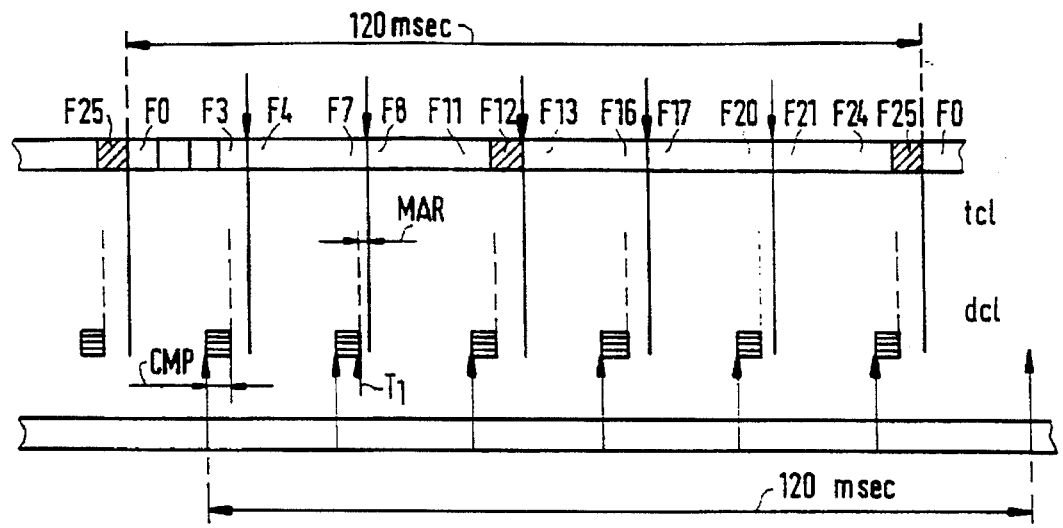
FIG. 3 shows a received frame structure in a secondary station according to the present invention, with a time slot sampling clock and a data clock.

FIG. 3 shows a received frame structure FR in the secondary station MS1 according to the present invention, showing positions of the time slot sampling clock tcl and the data clock dcl, with respect to each other. Shown is an uplink GSM multiframe of 26 frames, repetitively numbered F0 to F25, the multiframe FR having a duration of 120 msec. Such a multiframe structure is described on pp. 215–216 of the Mouly handbook.

In GSM, each TDMA frame of a multiframe structure has 8 time slots. Also, in GSM, information is transmitted in bursts having a finite duration, the bursts being transmitted in the time slots. Frame number F12 is a so-called SACCH (Slow Associated Control Channel) in GSM, providing control information for a number of consecutive time slots. Frame number F25 is an idle frame. At least 4 bursts are necessary to transmit 20 msec of coded speech information. Due to frame interleaving, as applied on the radio interface in GSM, 20 msec of coded speech information is distributed over 8 bursts. With horizontally hatched blocks, a computational time CMP for channel coders and speech coders (not shown) is indicated, such speech coders operating on segments of speech having a duration of 20 msec. Between two horizontally hatched blocks, a buffer (not shown) is filled by 160 samples for subsequent processing by a speech coder. As can be seen in FIG. 3, there is still a time margin MAR after computation, i.e., at the instant T1, before transmission instant TXR immediately following the instant T1, but it can also be seen that the two clock systems, i.e., the time slot sampling clock and the data clock, only allow for a small asynchronism or slip between the two clock systems. With secondary station MS1, as described in FIG. 2, no unacceptable i.e., a slip, giving rise to data loss, normally occurs as, all clocks are derived from the same reference clock signal generator 20.

Figure 4A:
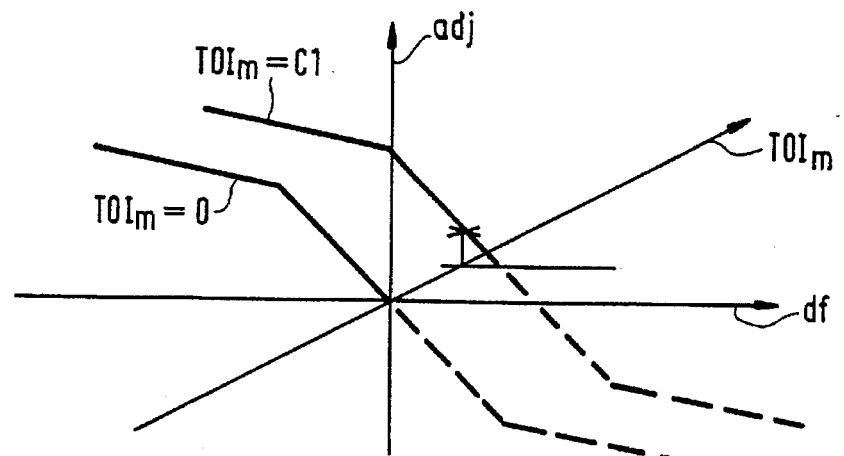
FIG. 4A shows characteristics for determining an adjustment signal according to the present invention, for a constant time slot delay.

FIG. 4A shows characteristics for determining an adjustment signal according to the present invention, for a constant time slot delay. Shown are axes adj, df, and $TOI_m$, wherein adj=f($TOI_m$, df), for a constant mean time slot delay $TOI_m$. Shown are characteristics for $TOI_m$=0, and for $TOI_m$=C1, C1 being a given constant value. In the shown 3-dimensional plane, positive adjustment signals adj are indicated with a solid line, and negative adjustment value adj are indicated with a dashed line. As an initial state, it is assumed that a transmitted burst by the primary station BS1 is expected at the switch 36 in the secondary station MS1 such that the time slot delay TOI and the derivate $TOI_d$ of the time slot delay TOI are positive. With such an initial state, for a positive value of the signal FOI and positive df, the frequency of the reference clock signal generator 20 should be decreased, i.e. adj<0, and for a positive value of the time slot delay TOI, the frequency of the reference clock signal generator 20 should be increased, i.e., adj>0.

Figure 4B:
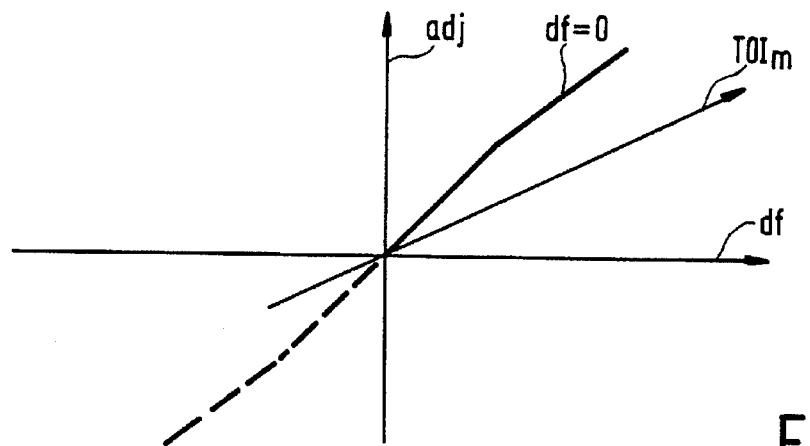
FIG. 4B shows characteristics for determining an adjustment signal according to the present invention, for a constant derivate of the time slot delay.

FIG. 4B shows characteristics for determining an adjustment signal according to the present invention, for a constant derivate $TOI_d$ of the time slot delay TOI. Shown is a characteristic for df=0, i.e., shown is a characteristic in the adj-$TOI_m$ plane.

Figure 4C:
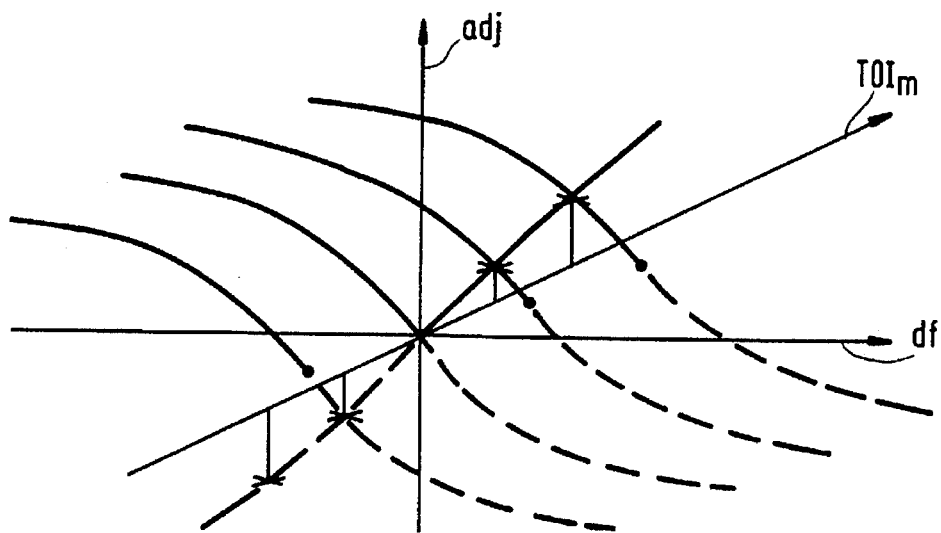
FIG. 4C shows 3-dimensional characteristics for determining an adjustment signal according to the present invention.

FIG. 4C shows 3-dimensional characteristics for determining the adjustment signal adj according to the present invention, in which adj=f($TOI_m$+df), the characteristics field taking system constraints into account, e.g., according to GSM Recommendations.

Figure 5:
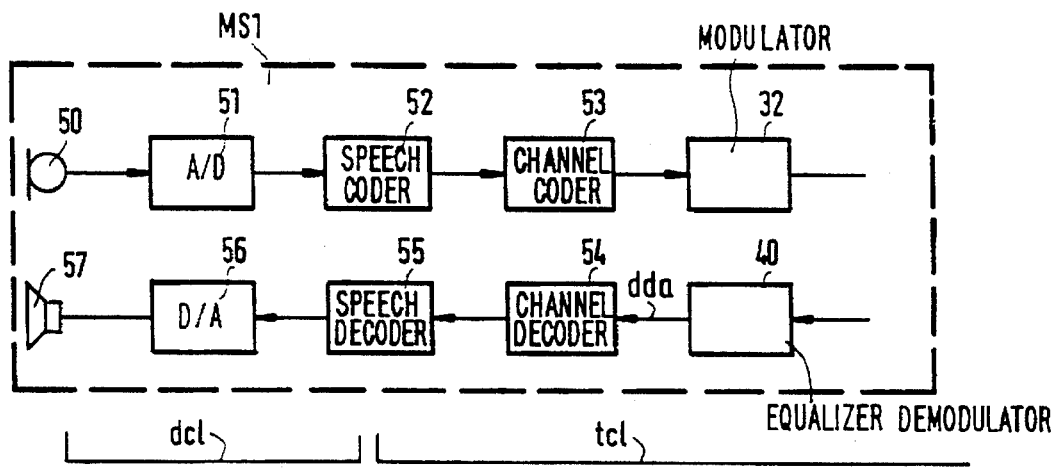
FIG. 5 shows a block diagram of speech paths in the secondary station.

FIG. 5 shows a block diagram of speech paths in the secondary station MS1 according to the present invention. A speech path from the secondary station MS1 in the direction of the primary station BS1 comprises 1) a microphone 50, 2)

an analog-to-digital converter 51, 3) a speech coder 52, and 4) a channel coder 53, coupled to the modulator 32. A speech path from the primary station BS1 in the direction of the secondary station MS1 comprises 1) a channel decoder 54 coupled to the equalizer/demodulator 40, 2) a speech decoder 55, 3) a digital-to-analog converter 56, and 4) a receiver 57. In FIG. 5, it is indicated at which parts of the secondary station MS1 the data clock dcl and the time slot sampling clock tcl operate.

Figure 6:
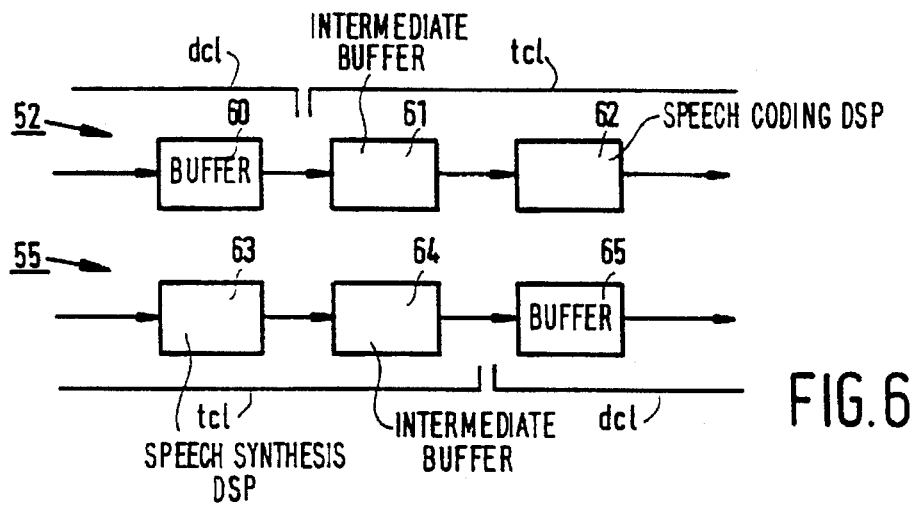
FIG. 6 shows a block diagram of a speech (de)coder in the speech paths.

FIG. 6 shows a block diagram of the speech coder 52, and the speech decoder 55, in the speech paths. The speech coder 52 comprises a) a buffer 60, which can comprise 160 speech samples (corresponding to 20 msec of speech) generated by the analog-to-digital converter 51, b) an intermediate buffer 61 for buffering 160 samples per 20 msec, and a speech coding algorithm comprised in a digital signal processor 62. Such an algorithm can be a known algorithm such as applied in a GSM system. Each time when the buffer 60 is full, its content is copied into the intermediate buffer 61.

The speech decoder 55 comprises 1) a speech synthesis algorithm in a digital signal processor 63, the algorithm being known in the art, 2) intermediate buffer 64 for 160 samples per call of the speech decoder 63, and 3) a buffer 65. Each time when the buffer 65 is empty, a copy of the contents of the intermediate buffer 64 is copied into the buffer 65. In FIG. 6, it is indicated at which parts of the speech (de)coder the data clock dcl and the time slot sampling clock tcl operate.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. A time division multiple access digital transmission system comprising at least one primary station and a plurality of secondary stations, in which system the primary station transmits information to the secondary stations in frames comprising synchronization information, and comprising user information in time slots, and in which system a secondary station of the plurality of secondary stations includes a reference clock signal generator and the secondary station comprises:

time slot delay determining means for determining a time slot delay between a received time slot position for the secondary station and an expected time slot position, conversion means for converting the determined time slot delay into a first frequency offset from which, as a function thereof, is developed an adjustment signal for adjusting a frequency of the reference clock signal generator of the secondary station;

a time slot sampling clock and a data clock derived from a reference clock signal generated by the reference clock signal generator of the secondary station; and means for reducing a clock slip between the time slot sampling clock and the data clock.

2. The time division multiple access digital transmission system according to claim 1, wherein the adjustment signal is a function of the determined first frequency offset and the determined time slot delay.

3. The time division multiple access digital transmission system according to claim 2, wherein the function is a proportionality function.

4. The time division multiple access digital transmission system according to claim 1, wherein a time slot sampling clock and a data clock of the secondary station are derived from a reference clock signal generated by the reference clock signal generator of the secondary station.

5. The time division multiple access digital transmission system according to claim 1, wherein the system is a mobile radio system.

6. The time division multiple access digital transmission system according to claim 1 further comprising means for developing said adjustment signal.

7. The time division multiple access digital transmission system according to claim 1 wherein said conversion means comprises means for developing said adjustment signal.

8. A time division multiple access digital transmission system comprising at least one primary station and a plurality of secondary stations, in which system the primary station transmits information to the secondary stations in frames comprising synchronization information, and comprising user information in time slots, and in which system a secondary station of the plurality of secondary stations includes a reference clock signal generator and the secondary station comprises:

time slot delay determining means for determining a time slot delay between a received time slot position for the secondary station and an expected time slot position, conversion means for converting the determined time slot delay into a first frequency offset from which, as a function thereof, is developed an adjustment signal for adjusting a frequency of the reference clock signal generator of the secondary station; and wherein the determined time slot delay is filtered by means of a smoothing filter before being included into the adjustment signal.

9. A time division multiple access digital transmission system comprising at least one primary station and a plurality of secondary stations, in which system the primary station transmits information to the secondary stations in frames comprising synchronization information, and comprising user information in time slots, and in which system a secondary station of the plurality of secondary stations includes a reference clock signal generator and the secondary station comprises:

time slot delay determining means for determining a time slot delay between a received time slot position for the secondary station and an expected time slot position, conversion means for converting the determined time slot delay into a first frequency offset from which, as a function thereof, is developed an adjustment signal for adjusting a frequency of the reference clock signal generator of the secondary station; and wherein the adjustment signal includes a second frequency offset signal instead of the first frequency offset signal, in case of an expected discontinuity in the determined time slot delay, the second frequency offset signal being a signal which is proportional to a received carrier signal frequency and an expected received carrier frequency.

10. A secondary station for use in a time division multiple access digital transmission system in which a primary station transmits information to secondary stations in frames comprising synchronisation information, and comprising user information in time slots, the secondary station including a reference clock signal generator, and being characterized by:

time slot delay determining means for determining a time slot delay between a received time slot position for the secondary station and an expected time slot position, conversion means for converting the determined time slot delay into a first frequency offset from which, as a function thereof, is determined an adjustment signal for adjusting a frequency of the reference clock signal generator of the secondary station; and means for reducing a clock slip between a time slot sampling clock produced in said secondary station and a data clock produced in said secondary station.

11. A secondary station for use in a digital transmission system comprising a primary station and the secondary station, in which system the primary station transmits information to the secondary station in frames comprising synchronisation information, and comprising user information in time slots, the secondary station comprising:

a reference clock signal generator;

time slot delay determining means for determining a time slot delay between a received time slot position for the secondary station and an expected time slot position; and means for developing an adjustment signal for adjusting a frequency of the reference clock signal generator;

means for converting the determined time slot delay into a first frequency offset;

wherein the adjustment signal is developed as a function of the first frequency offset; and means for generating a time slot sampling clock and a data clock and means for reducing a clock slip therebetween.

12. The invention as defined in claim 11 wherein the means for developing develops the adjustment signal also as a function of the determined time slot delay.

13. The invention as defined in claim 12, wherein the function of the determined time slot delay is a proportionality function.

14. The invention as defined in claim 11 further comprising:

means, responsive to the determined time slot delay, for determining an integrated time slot delay; and wherein the means for developing develops the adjustment signal also as a function of the integrated time slot delay.

15. The invention as defined in claim 11, wherein a time slot sampling clock and a data clock of the secondary station are derived from a reference clock signal generated by the reference clock signal generator.

16. The invention as defined in claim 11, wherein the transmission system is a mobile radio system.

17. A secondary station for use in a digital transmission system comprising a primary station and the secondary station, in which system the primary station transmits information to the secondary station in frames comprising synchronisation information, and comprising user information in time slots, the secondary station comprising:

a reference clock signal generator;

time slot delay determining means for determining a time slot delay between a received time slot position for the secondary station and an expected time slot position;

means for developing an adjustment signal for adjusting a frequency of the reference clock signal generator; and means for converting the determined time slot delay into a first frequency offset; wherein the adjustment signal is developed as a function of the first frequency offset;

a filter for smoothing the determined time slot delay; and wherein the function used by the means for developing the adjustment signal is a joint function of the smoothed determined time slot delay supplied by the filter and the determined first frequency offset.

* * * * *